US007886355B2

(12) United States Patent
Rager et al.

(10) Patent No.: US 7,886,355 B2
(45) Date of Patent: Feb. 8, 2011

(54) SUBSIDY LOCK ENABLED HANDSET DEVICE WITH ASYMMETRIC VERIFICATION UNLOCKING CONTROL AND METHOD THEREOF

(75) Inventors: Kent D. Rager, Gurnee, IL (US); Scott P. Debates, Vernon Hills, IL (US); Joel D. Voss, Elkhorn, WI (US)

(73) Assignee: Motorola Mobility, Inc., Libertyville, IL (US)

( * ) Notice: Subject to any disclaimer, the term of this patent is extended or adjusted under 35 U.S.C. 154(b) by 1258 days.

(21) Appl. No.: 11/428,034

(22) Filed: Jun. 30, 2006

(65) Prior Publication Data

US 2008/0005577 A1    Jan. 3, 2008

(51) Int. Cl.
G06F 7/04    (2006.01)
(52) U.S. Cl. .................. 726/21; 713/176; 455/410; 455/411
(58) Field of Classification Search .................. 455/403, 455/410–411, 558, 418–420; 380/30, 249; 726/34, 21; 713/176; 705/65, 73, 76; 379/112, 379/114
See application file for complete search history.

(56) References Cited

U.S. PATENT DOCUMENTS

| 5,613,001 | A | 3/1997 | Bakhoum |
| 5,721,781 | A | 2/1998 | Deo et al. |
| 5,864,757 | A | 1/1999 | Parker |
| 6,011,976 | A | 1/2000 | Michaels et al. |
| 6,195,547 | B1 | 2/2001 | Corriveau et al. |
| 6,259,908 | B1 | 7/2001 | Austin |
| 6,314,283 | B1 | 11/2001 | Fielden |
| 6,321,079 | B1 | 11/2001 | Cooper |
| 6,393,270 | B1 | 5/2002 | Austin et al. |
| 6,516,413 | B1 | 2/2003 | Aratani et al. |
| 6,550,010 | B1 | 4/2003 | Link, II et al. |
| 6,799,155 | B1 | 9/2004 | Lindemann et al. |
| 6,883,052 | B2 | 4/2005 | Dorenbeck et al. |
| 7,178,027 | B2 | 2/2007 | Faigle |
| 7,505,758 | B2 * | 3/2009 | Choi .......................... 455/411 |
| 2002/0065778 | A1 | 5/2002 | Bouet et al. |

(Continued)

FOREIGN PATENT DOCUMENTS

WO    WO 2004/045192 A2    5/2004

OTHER PUBLICATIONS

RSA Laboratories, "PKCS #5 v.2.0: Password-Based Cryptography Standard", Mar. 25, 1999, pp. 1-30.*

*Primary Examiner*—Kimyen Vu
*Assistant Examiner*—Chi Nguy

(57) ABSTRACT

A method for controlling subsidy locking of a handset device includes storing, in a handset device, an asymmetrically digitally signed subsidy unlock data block that has been modified based on a password after signing (505); modifying the stored unlock data block based on a received subsidy unlock password (510); and granting subsidy unlock status if the asymmetric digital signature of the modified, stored unlock data block properly verifies (510). A method (110) for controlling subsidy locking of a handset device includes storing, in the handset device, an asymmetrically digitally signed subsidy unlock data block that comprises a password portion that has been modified after signing (112); replacing the contents of the modified password portion with a received subsidy unlock password to produce an updated subsidy unlock data block (116); and granting subsidy unlock status if the asymmetric digital signature of the updated subsidy unlock data block properly verifies (118).

30 Claims, 9 Drawing Sheets

U.S. PATENT DOCUMENTS

| | | |
|---|---|---|
| 2005/0045717 A1 | 3/2005 | Rager et al. |
| 2005/0289078 A1 | 12/2005 | Wary et al. |
| 2006/0039564 A1 | 2/2006 | Rao |
| 2006/0059363 A1* | 3/2006 | Mese et al. ............ 713/185 |
| 2006/0129848 A1 | 6/2006 | Paksoy et al. |
| 2006/0168210 A1 | 7/2006 | Ahonen et al. |
| 2007/0056042 A1 | 3/2007 | Qawami et al. |
| 2007/0083766 A1 | 4/2007 | Farnham et al. |
| 2007/0165844 A1 | 7/2007 | Little |
| 2008/0003980 A1 | 1/2008 | Voss et al. |
| 2008/0125084 A1* | 5/2008 | Cambois et al. ............ 455/411 |
| 2008/0181408 A1 | 7/2008 | Hird |

* cited by examiner

SUBSIDY LOCK ENABLED HANDSET DEVICE WITH ASYMMETRIC VERIFICATION UNLOCKING CONTROL AND METHOD THEREOF

FIELD OF THE DISCLOSURE

The disclosure relates generally to wireless network handset devices and, more particularly, to wireless network handset devices enabled for subsidy locking.

BACKGROUND OF THE DISCLOSURE

Wireless communication handsets are typically manufactured to be capable of operating on a variety of service provider networks. To personalize a handset to a specific network provider and customer, a device called a subscriber identity module, or SIM, card is inserted into the handset. SIM cards hold data parameters, such as home public land mobile network (HPLMN) information, international mobile subscriber identifier (IMSI), and group identifiers (GID1/GID2), that are coded with values that bind the handset to the issuing service provider and the customer. When a service provider sells a service agreement, the purchasing customer is typically provided a handset with a pre-installed, personalized SIM card.

Wireless communication network service providers frequently provide these handsets, such as cellular telephones, to new customers at deep discounts as an enticement to sign long term service agreements. In this case, the service provider essentially sells the handset to the new customer at a loss, called a subsidy. This subsidy represents a substantial investment that the service provider hopes to recover from the customer in the form of user fees to be collected over the life of the service agreement.

The subsidy is a marketing investment that the service provider seeks to protect via a subsidy lock mechanism in the handset. A subsidy lock is used to insure that a subsidized handset can only be used with SIM cards issued by the subsidizing operator such that this handset will generate billable airtime for that operator. Various hardware or software techniques are used to insure that the handset can only accept SIM cards issued by the subsidizing operator. The subsidy locking mechanisms must be very robust to prevent sophisticated hackers from circumventing the subsidy lock, replacing the SIM card, and then reselling a subsidized handset to a user of another network. At the same time, the subsidy locking mechanisms must be configured to easily allow a customer to unlock the phone via a password at the end of the service agreement should the customer choose to switch to a different service provider.

Subsidy locking implementations may use hardware designs supporting "secure boot" functionality and "secret key" hardware encryption. A "secure boot" capability utilizes asymmetric digital signatures, whereby the root of trust is embedded in the hardware to validate that the device software is authentic before executing it. This validation insures that the software has not been modified by hackers to bypass the security checks of the SIM-lock implementation. If the software is, indeed, modified, then it must be re-signed in order to pass the secure boot process. The digital signing process requires a private encryption key which is kept on a secure signing server at the manufacturer, not within the handset. Thus, unauthorized persons do not have knowledge of this key and hence cannot generate a new signature on code that they may have modified. A limitation of asymmetric signing techniques is that signed data is fixed and cannot be altered after leaving the manufacturing environment because of lack of knowledge of the private signing key.

"Secret key" hardware encryption involves a symmetric encryption algorithm, such as 3DES, implemented in hardware utilizing a key variable contained in that hardware. This key variable is randomly assigned to each device, such that it is different between each device. No records are kept to track which key value was assigned to each part. Furthermore, there are no hardware or software interfaces that can read the value of this key. Thus, the key is a secret hidden in the hardware. Hardware encryption using this key is useful for encrypting data for the purpose of integrity protection and for secrecy of that data for storage in an external memory, such as a flash memory IC. Because the encryption key is random, data cannot be copied into another device—it will only decrypt successfully on the original device. In addition, protected data cannot be altered since it would require re-encrypting using the secret key.

The subsidy locking, or SIM-lock, feature involves several data parameters that must be protected from tampering (i.e. from unauthorized modification) including a lock state that indicates if the handset is locked or unlocked. In addition, if the handset is locked, there are parameters (such as a PLMN list, IMSI digits, GID1 and GID2 values, etc.,) that indicate which SIM cards are allowed. The handset user must be able to unlock the subsidy lock by entering a password at the completion of the contract term. Such passwords preferably are randomly assigned to each handset and tracked in a secure database. Because the lock state parameter must change during this unlocking process, these parameters may be protected via symmetric encryption utilizing a secret hardware encryption key as described above.

Symmetric encryption can be very effective in preventing unauthorized unlocking provided that there are not any security vulnerabilities in the handset software that have the privilege to use the hardware encryption engine. However, it is very difficult, if not impossible, to eliminate all vulnerabilities. Most importantly, all of the information, such as the secret hardware encryption key, necessary to compute the values that represent the unlocked state is hidden in the product. Therefore, a hacker may be able to find a security vulnerability that tricks the handset into computing the proper encrypted value representing the unlocked state. For example, it may possible to execute software code that processes a correct password entry by convincing the handset software that a user has already entered a correct password. Other potential security vulnerabilities, such as buffer overflows, or signed-integer math overflows/underflows, may be exploited to allow the execution of software that was not validated by the secure boot checking. Non-validated software could then make use of the hardware encryption capability on the handset to encrypt and store a value representing the unlocked state. It is therefore very useful to provide a more secure method for protecting subsidy locking parameters in handset devices.

BRIEF DESCRIPTION OF THE DRAWINGS

The present disclosure disclosure and the corresponding advantages and features provided thereby will be best understood and appreciated upon review of the following detailed disclosure disclosure, taken in conjunction with the following drawings, where like numerals represent like elements, in which.

DETAILED DESCRIPTION OF THE DISCLOSURE

Figure 1:
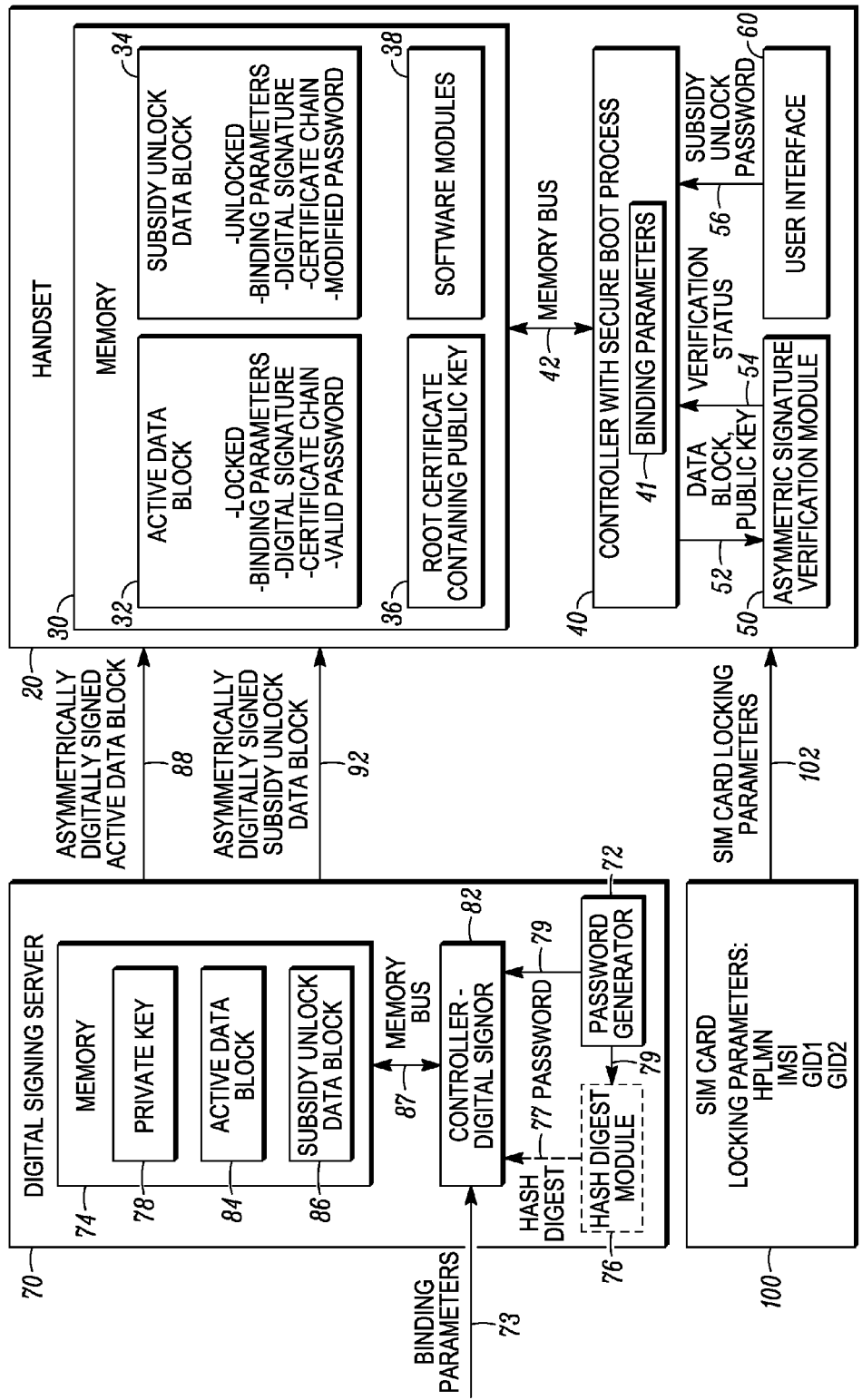
FIG. 1 is a schematic block diagram of a system employing one example of a subsidy-locking handset device in accordance with one embodiment of the disclosure.

A method provides improved security for subsidy locking a handset device, such as a cellular telephone, by among other things, using asymmetric digital signature verification to validate the lock state and an unlocking password. In an exemplary embodiment of the present disclosure, a subsidy-locked handset device includes memory that stores an asymmetrically digitally signed active data block and unlock data block. The signed active data block represents the current lock state of the handset. Prior to storage in the handset memory, the unlock data block is first generated with a locking state parameter set to the unlocked state and with binding parameters associated with a circuit in the handset device. The unlock data block is then asymmetrically digitally signed. After signing, the unlock data block is modified based on a password and is then stored in the handset memory. In a first embodiment, the modifying of the unlock data block may include replacing or altering of a password portion of the signed unlock data block. In a second embodiment, the modifying of the unlock data block may include encrypting of the signed unlock data block based on a password.

A handset provisioned with such an unlock data block and with an active data block indicating a locked state remains in the locked state until the asymmetric digital signature of the unlock data block can be verified via a public key. A controller is operatively coupled to the handset memory and is operative to modify the stored, unlock data block. In the first embodiment, the modifying of the stored, unlock data block may include replacing the contents of the modified password portion of the stored subsidy unlock data block with a received subsidy unlock password. In the second embodiment, the modifying of the stored, unlock data block may include decrypting the stored unlock data block based on a received unlock password. The controller is further operative to grant subsidy unlock status if the modified subsidy unlock data block properly verifies based on an asymmetric digital signature verification process indicating that the correct subsidy password has been received. If the data block passes asymmetric digital signature and the locking state parameter is set to "unlocked", then the handset is unlocked. The binding parameters associated with the handset device may be verified to insure that the subsidy unlock data block can only be used to unlock one particular handset device. The active data block may be overwritten with the verified subsidy unlock data block.

As such, a method and apparatus is disclosed that enhances SIM-locking security by insuring that the handset device does not contain all of the critical information necessary for generating the unlock state. In particular, asymmetric digital signatures on the active and subsidy unlock data blocks that govern the lock and unlock states are generated using a private key that is not contained in the handset. Furthermore, the unlock password necessary to make the unlock data block validate is also not contained in the handset. Therefore, even if a hacker manages to get unauthorized software code to execute on the handset device, critical information needed to unlock the phone is simply not available in any form on the device.

FIG. 1 is a schematic block diagram a system 10 employing one example of a subsidy-locking handset device 20 in accordance with one embodiment of the disclosure. The system 10 includes a handset device 20, a digital signing server 70, and a SIM card 100. The handset device 20 may be operatively coupled to the digital signing server 70 and the SIM card 100. The SIM card 100, when coupled, provides SIM card locking parameters 102 to the handset device 20. The handset device 20 can be embodied as any suitable mobile communication device including, but not limited to, a cellular telephone, an internet appliance, a laptop computer, a palmtop computer, a personal digital assistant, a digital entertainment device, a radio communication device, a tracking device, a personal training device, or a combination thereof. In particular, the handset device 20 is preferably a device that connects to a wireless communications service, such as a cellular telephone service. For purposes of illustration only, a cellular telephone handset device 20 is exemplified, and includes: a controller 40 with a secure boot process; memory 30 including an active data block 32, a subsidy unlock data block 34, a root certificate containing a public key 36, software modules 38; an asymmetric signature verification module 50; and a user interface 60. In this example, the controller 40 executes software instructions obtained from the memory 30 via a memory bus 42 to control the operation of the handset device 20. The controller 40 is operatively coupled to the memory 30, the asymmetric signature verification module 50, and the user interface 60.

In this example, the controller 40 may be, for example, a DSP, microcontroller, central processing unit, baseband processor, co-processor, or any suitable processing device. In addition it may be discrete logic, or any suitable combination of hardware, software or firmware or any suitable structure. The controller 40 may be implemented with a "secure boot" capability. During secure booting, the controller 40 verifies the authenticity of all software code prior to execution to prevent the execution of malicious code.

The operational instructions, or software, executing on the controller 40 is stored in memory 30 which may include a single memory device or a plurality of memory devices. Such memory 30 may include any memory element(s) that stores digital data including, but not limited to, RAM, ROM, flash memory, hard disk drive, distributed memory such as servers on a network, CD-ROM or any suitable storage medium. It will be recognized that such memory may be integrated with the controller or take any suitable configuration. The root certificate containing the public key 36 is securely stored. For example, the root certificate may be securely stored by containing it along with software instructions that are signed and validated by the secure boot process. Alternatively, the root certificate may be stored in one-time-programmable (OTP) memory.

A dedicated asymmetric signature verification module 50 may be operatively coupled to the controller 40 for the purpose of performing software verification. Data block information and the public key 52 may be passed to the asymmetric signature verification module 50 for verification. The verification status 54 may be passed back to the controller 40. Alternatively, asymmetric signature verification may be performed by the controller 40. A user interface 60 may be operatively coupled to the controller 40. This user interface 60 provides a means for user input of a subsidy unlock password 56 for use in SIM or subsidy unlocking of the handset device 20. Binding parameters 41 associated with the circuits in the handset device 20 may be securely stored in the handset device 20. For example, processor and flash IC unique identifier (UID) values, may be stored in a circuit, such as the controller 40, or may be stored in the memory 30.

The asymmetrically digitally signed active data block 32 and asymmetrically digitally signed subsidy unlock data block 34 may be generated by a signing server 70 that is operatively coupled to the handset device 20 for that purpose. Alternatively, the handset device 20 may be coupled to a programming station, such as a PC, that is further coupled to the signing server 70. The programming station may generate the data for the active data block 84 and the subsidy unlock data block 86. The signing server 70 may compute the asymmetric digital signatures for the active data block 84 and the subsidy unlock data block 86 and may generate the password 79 and modify the subsidy unlock data block 86 after signing.

The handset device 20 may be sent by a manufacturer to a distribution center belonging to a network service provider. At the distribution center, each handset device 20 is operatively coupled to the digital signing server 70 for asymmetric digital signing of the active data block 84 and subsidy unlock data block 86. Alternatively, the handset device 20 may be configured and subsidy locked to a particular network service provider by the manufacturer before shipping the handsets to the service provider.

The digital signing server 70 may include memory 74 holding a private key 78, an active data block 84, and a subsidy unlock block 86. Alternatively, the private key may be held in a hardware security module (HSM), not shown, that is coupled to the signing server controller 82. A controller 82 is operatively coupled to the memory 74. The controller 82 is operative to generate and store in memory 74 a subsidy unlock data block 86, to asymmetrically digitally sign the subsidy unlock data block 86, to modify the asymmetrically digitally signed subsidy unlock data block 86 based on the password, and to send a modified asymmetrically digitally signed subsidy unlock data block 92 to the handset device 20. The controller 82 is further operative to generate and store in memory 74 an active data block 84, asymmetrically digitally sign the active data block 84, and send an asymmetrically digitally signed subsidy active data block 88 to the handset device 20.

The digital signing server 70 may include a password generator 72, such as a random password generator. The password 79 may be used directly by the controller 82 in the generation of the unlock data block 86. Alternatively, a hash digest module 76 may be included to generate a hash digest 77 of a random password 78. For example, a SHA-1 digest may be generated on the random password 78 to generate a password hash digest 77 having a fixed length. The subsidy unlock data block 86 may include the random or unique password 79 or password hash digest 77 for a password portion to protect the subsidy lock state from unauthorized disabling. It is understood that the password may be the literal password or may be any data representing or derived from the password such as a hash digest of the password.

Once the active data block 84 and subsidy unlock data block 86 are generated by the digital signor from binding parameters 73 and passwords 77 or 79, the controller 82 asymmetrically digitally signs the blocks using the private signing key 78. The digital signing method may be any algorithm that signs a data block such as, but not limited to, RSA, RSA-DSS, Full Domain Hash, DSA, ECDSA, and SHA algorithms as are known in the art. The signing may be performed by a hardware security module (HSM) which contains the private signing key. In the case of the active data block, the asymmetric digital signed active data block 88 is sent to the handset device 20 where the handset device 20 installs this block into memory 30 as the active data block 32. In the case of the unlock data block, the signed unlock data block is modified by the controller 82 to invalidate the signature that was computed and is then sent to the handset device 20 where the handset device 20 installs this block as the subsidy unlock data block 34.

In the first embodiment, the modification of the signed unlock data block includes altering the password field of the unlock data block after signing. For example, the password field may be cleared to all zeros or set to all ones. The resulting modified asymmetrically digitally signed unlock data block 92 will not pass an asymmetric digital signature verification without first "un-modifying" the contents of the password field to put back the correct subsidy unlock password that was present during the signing. In the second embodiment, the modification includes encrypting the signed unlock data block, or a portion thereof, such as the signature field portion, based upon the password. The password may be used to derive an encryption key used in the encryption, or secret key hardware encryption may be used in a block cipher mode such as counter mode or output feedback mode with an initialization vector derived from the password. The resulting modified asymmetrically digitally signed unlock data block 92 will not pass an asymmetric digital signature verification without first decrypting the modified asymmetrically digitally signed unlock data block 92, or portion thereof, based on the correct subsidy unlock password to thereby recreate the signed unlock data block.

The asymmetric digital signature verification of the unlock data block 34 in the handset device 20 uses a public key 36 stored in the handset device 20. The root certificate may contain a public key 36 corresponding to the private signing key 78. Alternatively, the root certificate may contain a public key 36 used to verify a certificate chain that contains the public key corresponding to the private signing key 78, which is sent to the handset device 20 by the digital signing server 70 for storage in memory 30.

When the handset device 20 powers on, or when a new SIM card 100 is inserted, the asymmetric digital signature of the active data block 32 stored in the handset memory 30 is verified. If the signature verifies, then the binding parameters in active data block 32 are compared against parameters stored in a circuit in the handset device 20 to insure that this active data block 32 is installed on the intended device. If this binding check passes, then the locking state parameter in the active data block 32 is checked. If locked, then the other locking parameters of the active data block are compared against information read from the inserted SIM card, such as HPLMN, GID1, and GID2, to decide if the SIM card 100 is accepted. If unlocked, then all SIM cards are accepted. However, if the active data block 32 does not verify, then the handset device will only be allowed to operate using a test SIM or for emergency (911) calls. When the SIM card 100 is not accepted, then a subsidy unlock event is triggered and the user is prompted for a subsidy unlock password 56.

Figure 2:
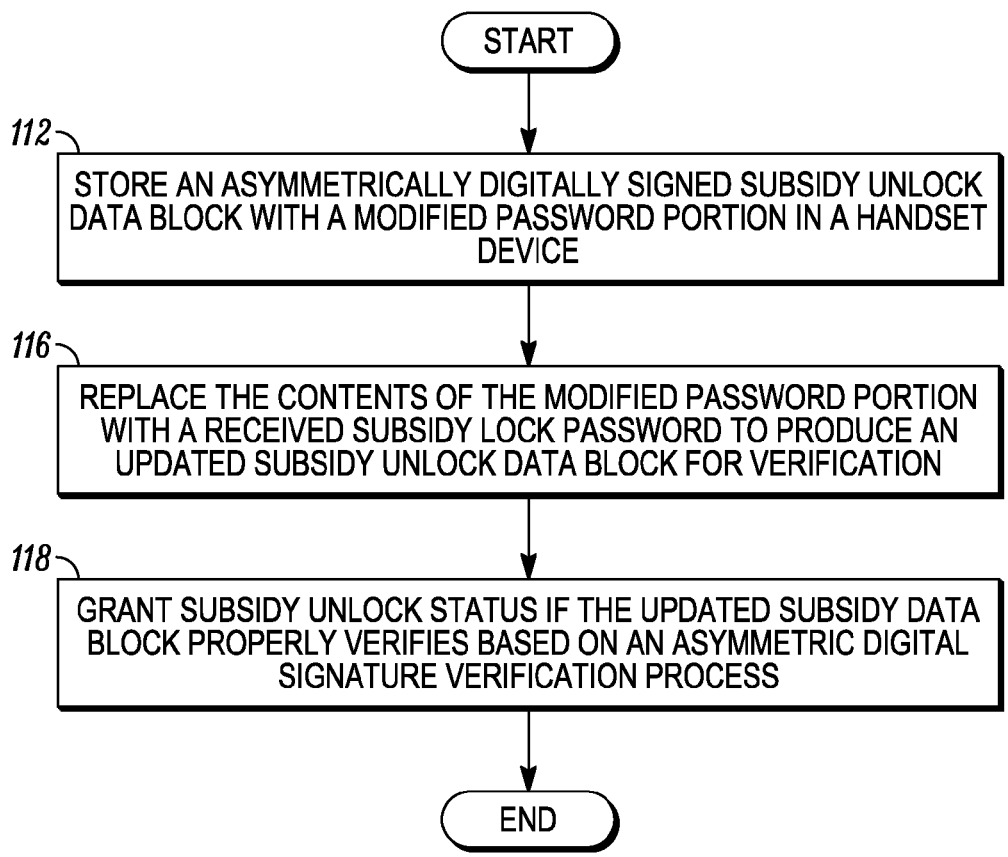
FIG. 2 is a flowchart illustrating one example of a method to control subsidy locking of a handset device in accordance with a first embodiment of the disclosure.

FIG. 2 is a flowchart illustrating one example of a method to control subsidy locking of a handset device in accordance with a first embodiment of the disclosure. In step 112, the asymmetrically digitally signed subsidy unlock data block 34 is stored in the handset device 20. The asymmetrically digitally signed subsidy unlock data block 34 includes a password portion that was modified after the subsidy unlock data block 34 was digitally signed. The subsidy unlock data block 34 preferably includes a locking state parameter set to the unlock state. The subsidy unlock data block 34 preferably includes binding parameters associated with a circuit in the handset device 20 such that the subsidy unlock data block 34 is only valid in this particular handset. In step 116, the contents of the modified password portion of the subsidy unlocking data block 34 are replaced with a received subsidy unlock password 56 to produce an updated subsidy unlock data block for verification. For example, the user interface 60 may be used by an operator to enter an unlocking password 56 in response to a request from the handset device 20 triggered by the insertion of an unaccepted SIM card 100. The modified password portion may be replaced with the received subsidy password directly or may be replaced with a representation of the received subsidy password such as a hash digest. In step 118, subsidy unlock status is granted if the updated subsidy unlock data block 34 properly verifies based on an asymmetric digital signature verification process. For example, the updated subsidy unlock data block 34 and the public key 36 are passed to the asymmetric signature verification module 50 where the digital signature of the subsidy unlock data block 34 is verified. Granting subsidy unlock status is preferably performed by overwriting or copying the subsidy unlock data block 34 into the active data block 32 location. Granting subsidy unlock status may further require that the locking state parameter of the verified subsidy unlock data block 32 be set to unlock. Granting subsidy unlock status may further require that binding parameters in the verified subsidy unlock data block 32 match parameters associated with a circuit in the handset device 20.

Figure 3:
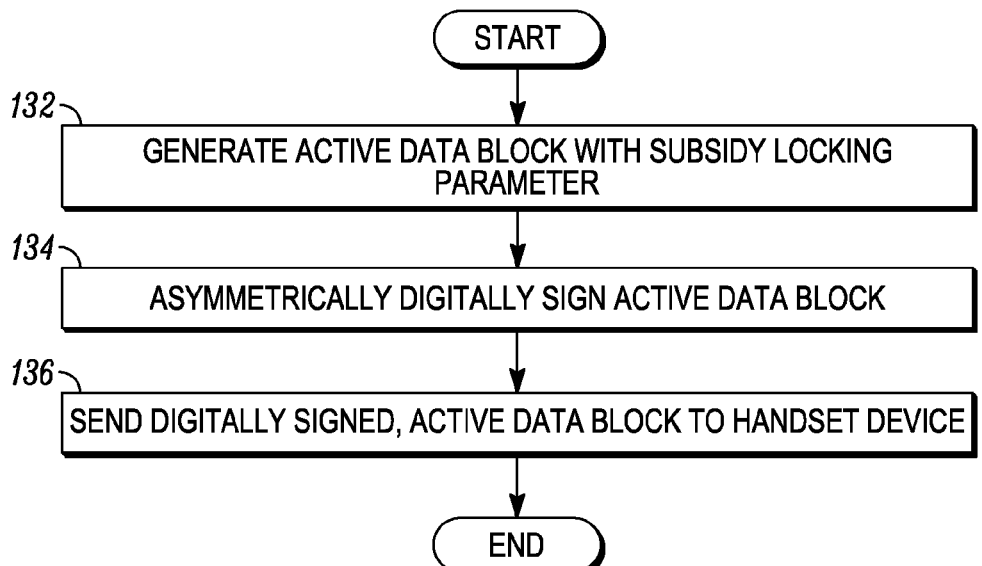
FIG. 3 is a flowchart illustrating one example of a subsidy locking method in accordance with one embodiment of the disclosure.

FIG. 3 is a flowchart illustrating one example of a subsidy locking method 130 in accordance with one embodiment of the disclosure. The digital signing server 70 signs and sends the active data block 32 to the handset device 20. The process begins in step 132 where the active data block 84 is generated including the binding parameters 73. The active data block 32 may be generated by the signing server 70 or by another device. In step 134, the digital signing server 70 digitally signs the active data block 84 using the private key 78. The digital signing method may be any algorithm that signs a data block such as, but not limited to, RSA, RSA-DSS, Full Domain Hash, DSA, ECDSA, and SHA algorithms as are known in the art. In step 136, the digital signing server 70 sends the digitally signed, active data block 88 to the handset device 20.

Figure 4:
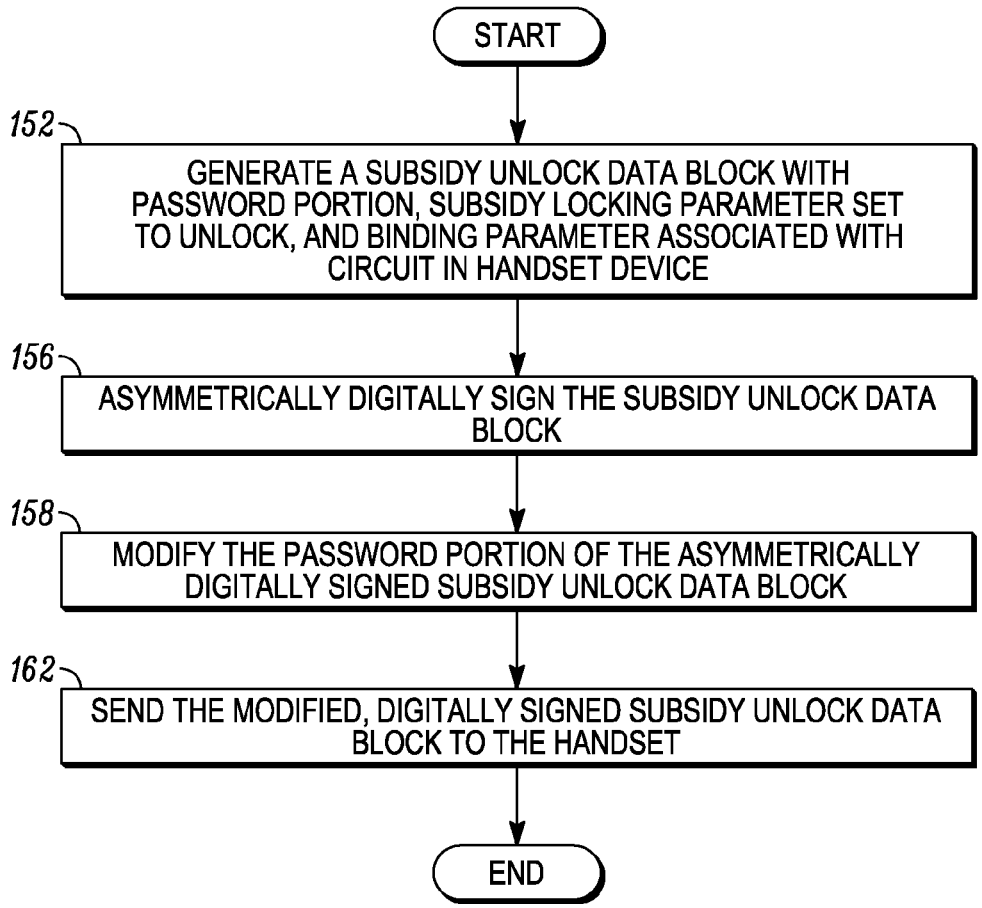
FIG. 4 is a flowchart illustrating one example of a subsidy locking method in accordance with a first embodiment of the disclosure.

FIG. 4 is a flowchart illustrating one example of a subsidy locking method 150 in accordance with a first embodiment of the disclosure. The method 150 begins in step 152 where the digital signing server 170 generates the subsidy unlock data block 86. Alternatively, the subsidy unlock data block 86 may be generated by another device and then stored into the signing server 70. The subsidy unlock data block 86 preferably includes a locking state parameter set to the unlock state. The subsidy unlock data block 86 preferably includes binding parameters associated with a circuit in the handset device 20 such that the subsidy unlock data block 86 is only valid in this particular handset. In step 152, the digital signing server 70 generates a password 78 or 79 for the subsidy unlock data block 86. The password 79 may be a randomly generated password to provide a unique unlocking password for each handset device. Alternatively, a hash digest 77, such as a SHA-1 hash, may be generated on the password 79 to hide the actual password value in a handset that has been unlocked or to insure that the password is of known length. In step 152, the password is written into the password portion of the subsidy unlock data block. In step 156, the digital signing server digitally signs the subsidy unlock data block 86 using the private key 78. The digital signing method may be any algorithm that signs a data block such as, but not limited to, RSA, RSA-DSS, Full Domain Hash, DSA, ECDSA, and SHA algorithms as are known in the art. In step 158, the digital signing server modifies the password portion of the unlock data block 86, such as by overwriting with zeroes or ones, to invalidate the computed signature. In step 162, the digital signing server 70 sends the modified, digitally signed, unlock data block 92 into the handset device.

Figure 5:
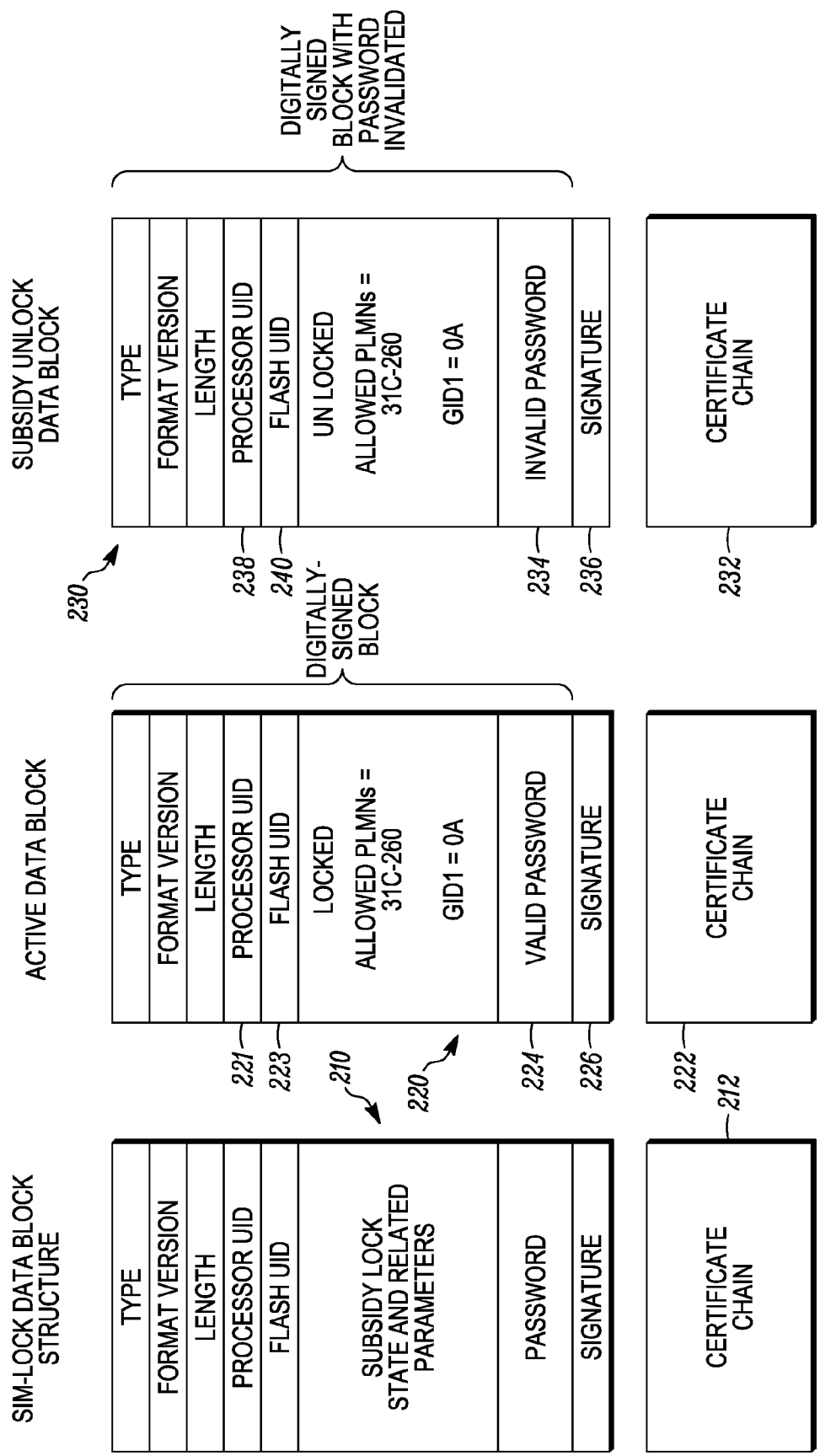
FIG. 5 is a schematic block diagram of signed data structures employing one example of subsidy locking of asymmetric digital signed data blocks in accordance with one embodiment of the disclosure.

FIG. 5 is a schematic block diagram of signed data structures employing one example of subsidy locking of asymmetric digital signed data blocks in accordance with one embodiment of the disclosure. An exemplary structure of an asymmetric digital signed SIM-lock data block is shown. The SIM-Lock data block structure includes an upper section 210 that includes a password field and a signature field. A lower section 212 may optionally be included with a certificate chain 212. The active data block 220 and unlock data block 230 are digitally signed using a private key in a manner bound to a specific handset. The active data block 220 has a subsidy locking state parameter of "locked". In addition, the password field 224 is valid, by definition, since the digital signature 226 is computed over the entire active data block 220 including password field 224 with no later modification. By comparison, the digital signature 236 of the subsidy unlock data block 230 is computed over the entire unlock data block with a correct, unlocking password, and then the password field 234 is invalidated. Both the active and subsidy unlock data blocks may contain certificate chains 222 and 232 that may be used for validation of the data block signature.

During checking of the subsidy lock state of the handset device, the digital signature of the active data block is verified against a public key stored in the handset device. Subsidy lock checking may be performed at power-up after secure boot if the phone was powered up with a SIM inserted. It may also be performed at SIM insertion if it is possible to insert a SIM while the phone is already powered on. Finally, subsidy lock checking may be done at other times, such as periodically, to verify that the SIM card hasn't been switched with one that should not be accepted. Optionally, the public key stored in the root certificate of the handset device may be used to verify a signature on the first certificate in a certificate chain that was stored along with the active data block. This certificate then contains another public key used to verify the signature on the next certificate in the chain. The last certificate in the chain contains a public key that is used to verify the signature on the active data block itself. The subsidy unlock data block may not be verified unless an event, such as the insertion of an unaccepted SIM card, causes the handset device to detect an unlocking event.

When the handset device 20 powers on, or when a new SIM card 100 is inserted, the asymmetric digital signature of the active data block stored in the handset memory is verified. If the signature verifies, then the binding parameters 221 and 223 in the active data block are compared against the handset device hardware values to insure that this active data block is installed on the intended device. If this binding check passes, then the locking state parameter in the active data block 32 is checked. If locked, then the other locking parameters, such as allowed PLMN, GID1, and GID2, of the active data block are compared against information read from the inserted SIM card, such as HPLMN, GID1, and GID2, to decide if the SIM card 100 is accepted. If the subsidy locking state is unlocked, then all SIM cards are accepted. If the active data block 32 does not verify, then the handset device will only be allowed to operate using a test SIM or for emergency (911) calls. When the SIM card 100 is not accepted, then a subsidy unlock event is triggered and the user is prompted for a subsidy unlock password.

If an attempt to unlock occurs, then a password is supplied by the user and is substituted into the password field 234 of the subsidy unlock data block 230. The digital signature of the subsidy unlock data block is then verified using the public key. If the subsidy unlock data block verifies, then the subsidy locking state is checked to see if it is set for locked or unlocked. In addition, the binding parameters, such as the Processor UID 238 and the Flash UID 240, of the subsidy unlock data block may be matched against the handset hardware so that the subsidy unlock data block can only be used in a single handset. If the subsidy lock state parameter is set to unlock, then the subsidy unlock data block is written over the active data block and effectively becomes the new active data block.

Figure 6:
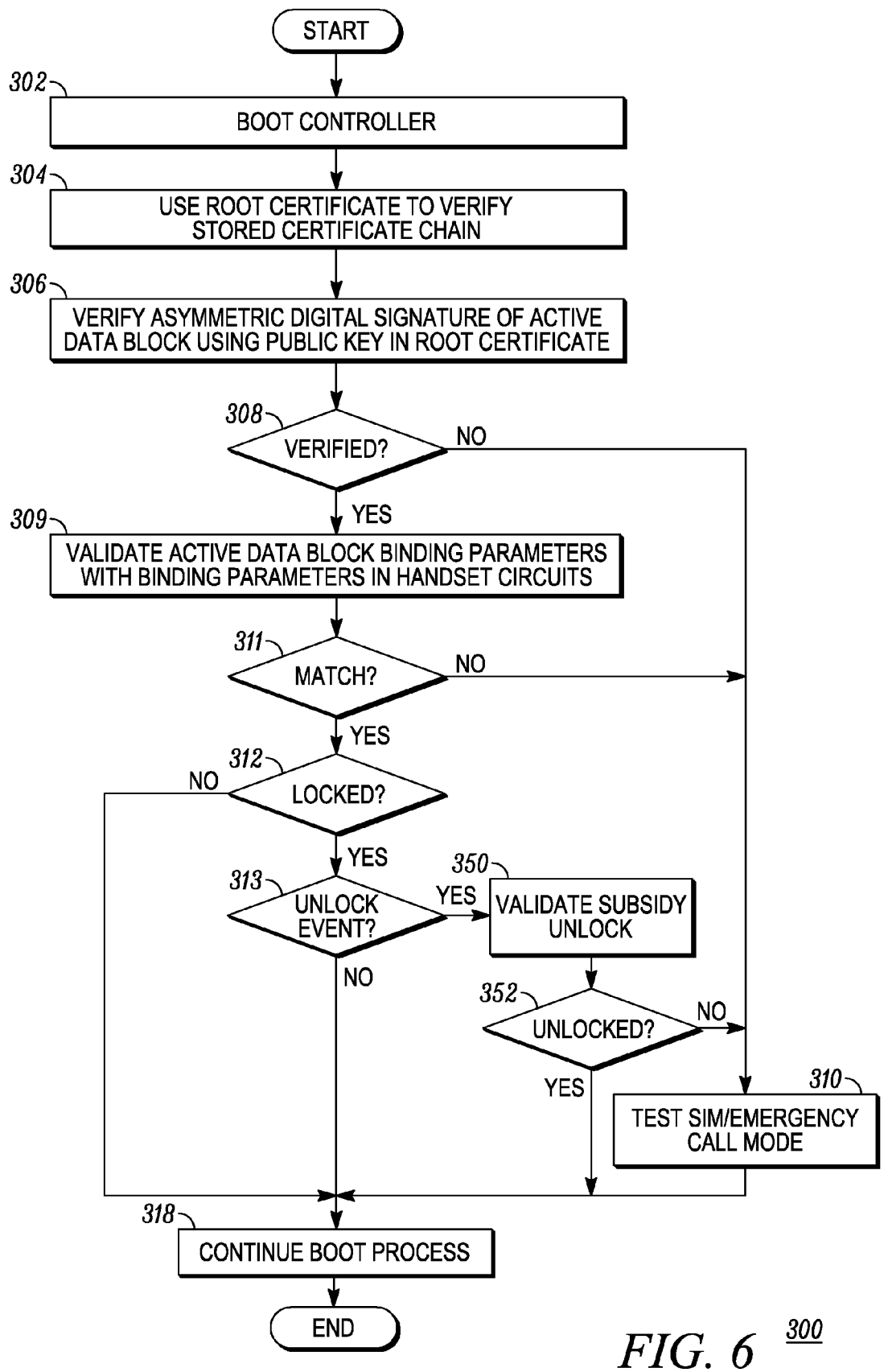
FIG. 6 is a flowchart illustrating one example of a method for controlling subsidy locking of a handset device in accordance with one embodiment of the disclosure.

FIG. 6 is a flowchart illustrating one example of a method for controlling subsidy locking of a handset device in accordance with one embodiment of the disclosure. During a power-up method 300, the handset device verifies and validates the software code that will be executed by the handset device. The process begins in step 302, where the controller is booted. The controller is implemented to execute a secure booting procedure to authenticate the software code image. Included in this image is a root certificate 36 which is considered trusted if the secure boot authentication passes. In step 304, the root certificate 36 is used to verify the signature of the stored certificate chain that had been received from the signing server. Asymmetric digital signature verification is performed to verify the first certificate in the certificate chain against this trusted root certificate public key. Additional asymmetric digital signature verification is then performed to verify each subsequent certificate in the certificate chain against the public key contained in the previous certificate in the chain. The digital signature verification method may be any algorithm that signs a data block such as, but not limited to, RSA, RSA-DSS, Full Domain Hash, DSA, ECDSA, and SHA algorithms as are known in the art. In step 306, the public key from the now verified final certificate in the certificate chain is used to perform asymmetric digital signature verification on the active data block 32. The controller 40 thereby verifies that the active data block 32 has not been altered in an unauthorized way. In step 308, if the active data block 32 signature does not verify, then the handset device 20 is made to work only in test SIM or Emergency Calling (911) mode in step 310. If the signature does verify, then active data block binding parameters are compared in step 309 to the binding parameters associated with the handset circuits, such as processor and flash IC unique identifier (UID) values, to insure that the active data block is installed in the intended handset. If there is not a match of the binding parameters in step 311, then the handset device 20 is again made to work only in test SIM or Emergency Calling (911) mode in step 310. If there is a match of the binding parameters in step 311, then the locking state parameter is checked in step 312. If the active data block is not locked in step 312, then the handset device 20 will work with any SIM card and the boot continues. However, if the active data block is locked, then in step 313, the handset determines if a subsidy unlock event has occurred. If an unlock event has not occurred in step 313, then the boot continues with the handset in the locked state. If an unlock event has occurred in step 313, then the subsidy unlock data block is validated in step 350 that is described in greater detail in FIG. 7. Referring again to FIG. 6, if the subsidy remains locked in step 352, then the handset device 20 may again be made to work only in test SIM or Emergency Calling (911) mode in step 310 or alternatively revert back to the lock state if desired. If the handset is unlocked in step 352, then the boot continues with the handset in the unlocked state. The handset device 20 compares SIM card 100 locking parameters, such as HPLMN, GID1, and GID2, with locking parameters, such as allowed PLMN list, GID1 or GID2 values, or additional IMSI digits, stored in the active data block 32 to determine if an accepted SIM card is inserted. If the SIM card is not accepted, a subsidy unlock event has occurred. Additionally, even if the SIM is accepted, a user may enter an "unlock" procedure through a handset menu. The handset device responds by validating the subsidy unlock data block in step 350. If the if the SIM is not accepted and the user does not enter the correct subsidy unlock password, then the handset goes into a state in which it can only make emergency calls and the boot process continues in step 318.

Figure 7:
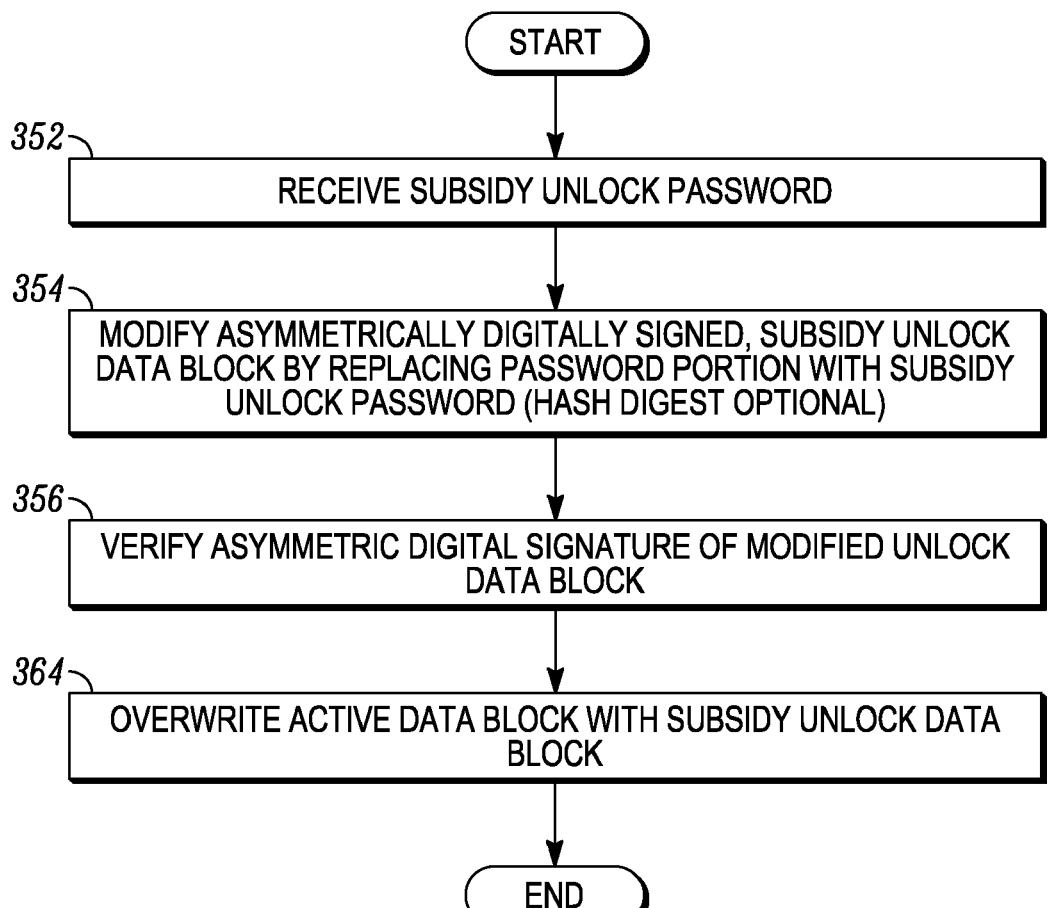
FIG. 7 is a flowchart illustrating one example of method for controlling subsidy locking of a handset device in accordance with a first embodiment of the disclosure.

FIG. 7 is a flowchart illustrating one example of method for controlling subsidy locking of a handset device in accordance with a first embodiment of the disclosure. In step 352, a subsidy unlock password is received from the user. For example, the insertion of an unaccepted SIM card may result in the handset device automatically requesting a password from the operator. In step 354, the subsidy unlock data block stored in the handset device is modified by writing this subsidy unlock password into the password field of the subsidy unlock data block. If the original digital signing process performed by the signing server used a hash digest of the random password for the unlock data block, then a hash digest will also be performed in this step and the hashed result written into the password field. In step 356, the asymmetric digital signature of this modified unlock data block is verified using the public key contained in the root certificate held in the handset device. The digital signature verification method may be any algorithm that signs a data block such as, but not limited to, RSA, RSA-DSS, Full Domain Hash, DSA, ECDSA, and SHA algorithms as are known in the art. If verified, then in step 364, the handset device overwrites the active data block location with the subsidy unlock data block to thereby grant subsidy unlock status to the handset device. The binding parameters in the unlock data block may be matched with binding parameters associated with circuits in the handset device 20 to insure that the subsidy unlock data block 34 is correctly bound to the handset device 20 by matching binding parameters 41, such as processor and flash IC unique identifier (UID) values, associated with handset circuits and stored permanently in the handset device 20 with the binding parameters stored in the unlock data block 34.

The exemplary implementation supports both single-layer and dual-layer lock types. A dual-layer lock type is one where parameters read from the SIM must match two checks. The first layer is always a check of the HPLMN of the SIM card 100 against an allowed PLMN list held in the active data block 32 in the handset device 20. This is the only check done in the single-layer lock type. In dual-layer SIM-locks, an additional check is also made. There are a number of dual-layer lock types that differ by which additional parameters are checked. These additional SIM-card parameters may be additional IMSI digits, a GID1 value, a GID2 value, or combinations of such additional parameters. If both layers of checking are successful, then the SIM card 100 is accepted.

A dual-layer subsidy lock may further comprise two unlocking passwords. A first password is used to change from a dual-layer lock to a single layer lock. This may be thought of as a partial unlocking of the handset. If a second password is entered, then the single-layer lock is also disabled such that the handset becomes completely unlocked. For example, a network subsidy clearing password (NWSCP) may be used for the complete unlocking while a secondary subsidy clearing password (SSCP) may be used for partial unlocking.

Figure 8:
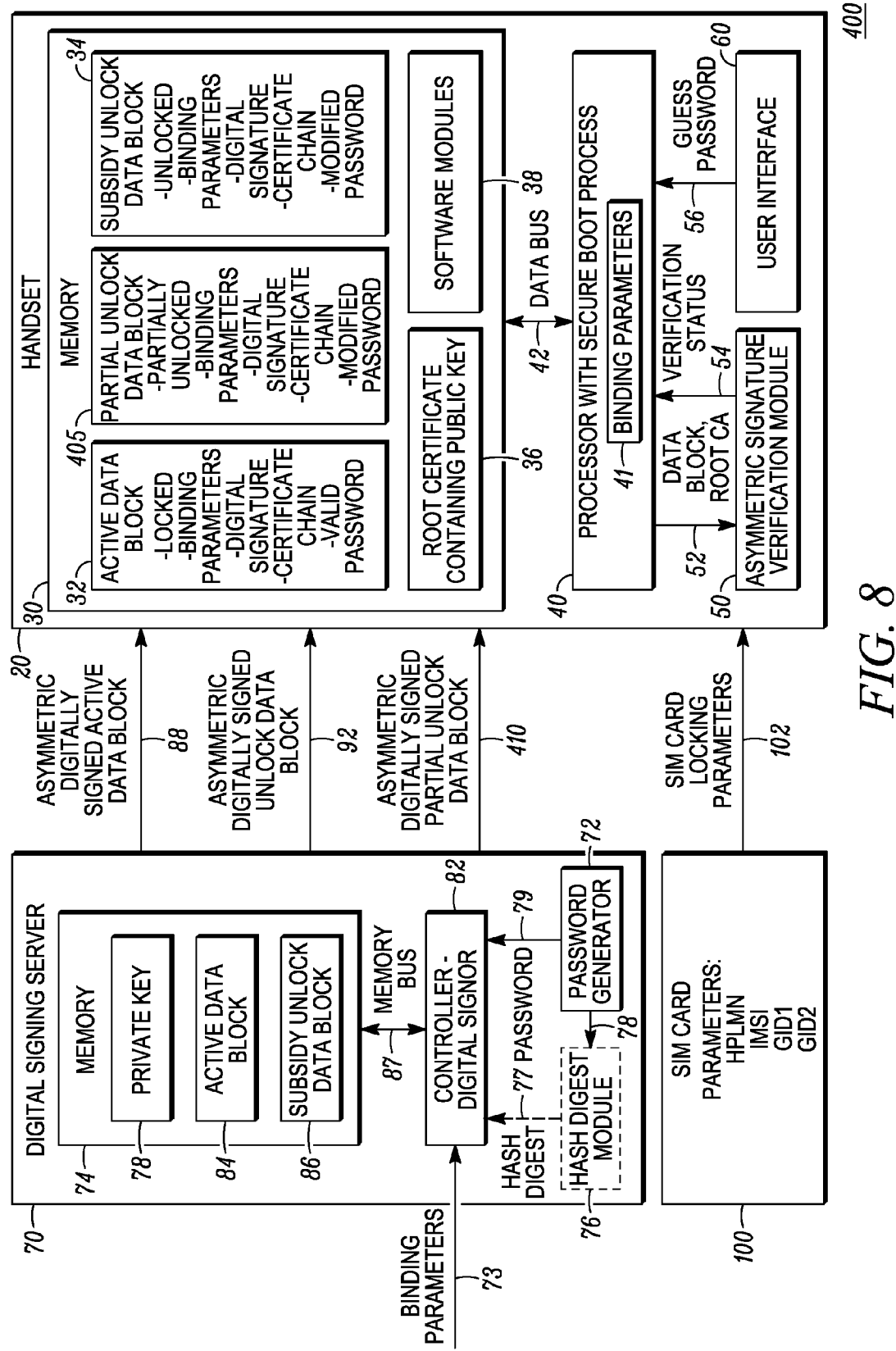
FIG. 8 is a schematic block diagram of a system employing one example of a subsidy-locking handset device in accordance with one embodiment of the disclosure.

FIG. 8 is a schematic block diagram of a schematic block diagram of a system 400 employing one example of a subsidy-locking handset device in accordance with one embodiment of the disclosure. This exemplary system 400 incorporates many of the same features as the circuit of FIG. 1. However, a partial unlock data block 405 is added to the memory 30 of the handset device 20. This partial unlock data block 405 is generated, signed, and password invalidated by the signing server 70 in the same way as the unlock data block 32. However, the subsidy lock status is set to "partially unlocked." The digital signing server 70 sends the completed partial unlock data block 410 to the handset device 20 for storage in the memory 30.

Figure 9:
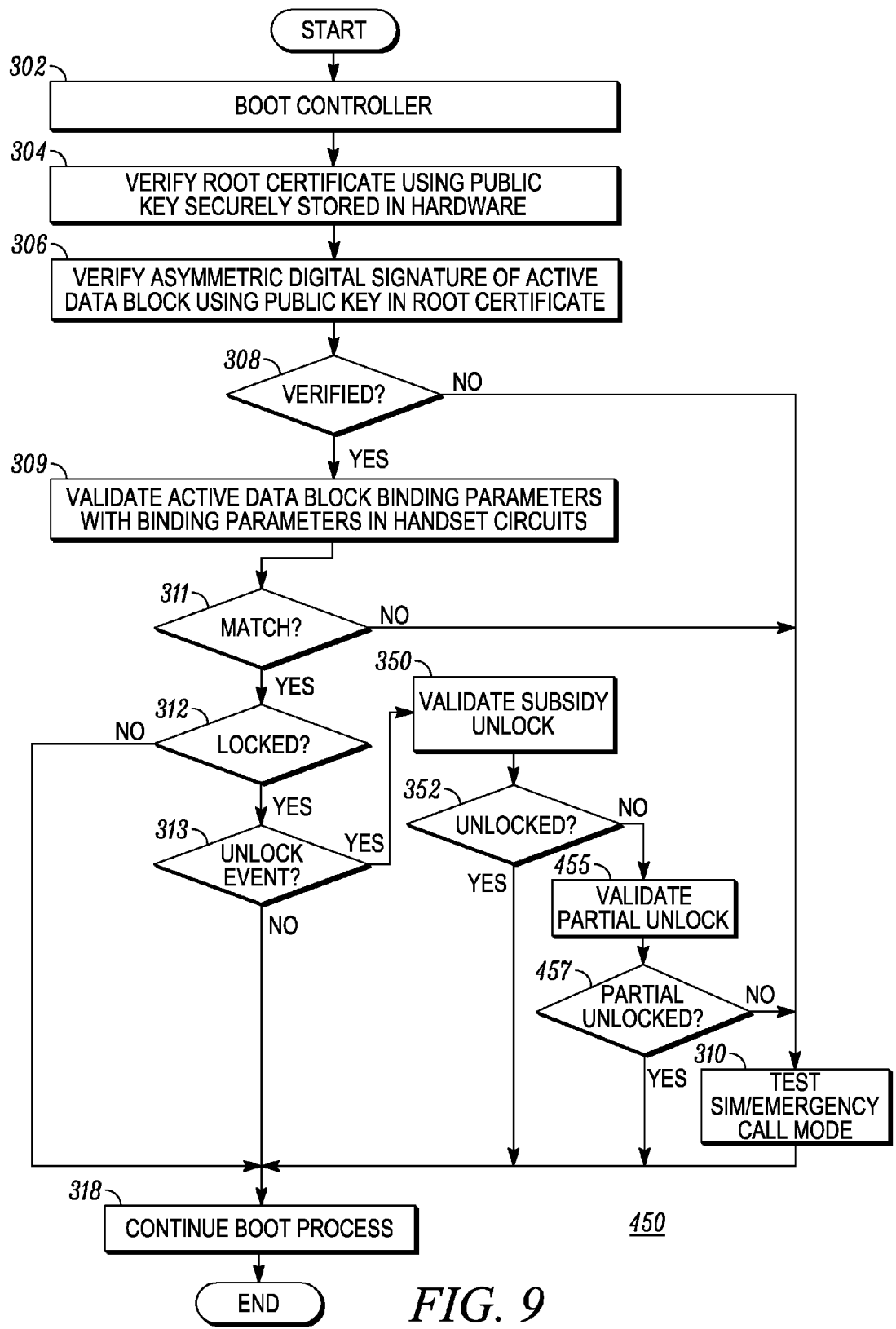
FIG. 9 is a flowchart illustrating one example of a method for controlling subsidy locking of a handset device in accordance with one embodiment of the disclosure.

FIG. 9 is a flowchart illustrating one example of a method for controlling subsidy locking of a handset device in accordance with one embodiment of the disclosure. This exemplary method 450 incorporates many of the same features as the method 300 of FIG. 6. However, following validation of the subsidy unlock in step 350, and checking of whether subsidy unlock occurred in step 352, the partial unlock is validated in step 455. For example, if a subsidy unlock password does not result in a digital verification of the subsidy unlock data block 34 in steps 350 and 352, then this same subsidy unlock password may be written into the partial unlock data block 405. A digital signature verification of the partial unlock data block is performed along with subsequent locking parameter validation of the partial unlock data block against the hardware and the SIM card as described for the subsidy unlock data block in FIG. 6. Referring again to FIG. 9, the partial unlock data block 405 is validated in step 455. If the subsidy remains locked in step 457, then the handset device 20 is again made to work only in test SIM or Emergency Calling (911) mode in step 310 or alternatively, revert back to the lock state if desired.

The exemplary embodiment is extendable to meeting industry standards, such as 3GPP 22.022, wherein several locking layers are described. For example, the 3GPP 22.022 describes personalization (locking) layers including network (HPLMN), service provider (GID1), corporate (GID2), IMSI 3 digit, and IMSI all digit. By providing asymmetric digitally signed active and unlock data blocks for each of the five personalization layers, all five personalization layers may be implemented in the handset.

The asymmetric digital signed data block technique may be further extended to provide a re-arming capability through a programming menu. For example, a copy of the originally provisioned active data block may also be stored into a factory default data block location. It would then be possible to return the handset device 20 to the original, locked state after an unlocking event. For example, if the phone has been unlocked, then a reset subsidy lock option may be presented to the user on the programming menu. If the user selects to reset the subsidy lock, then the factory default data block is written over the current contents of the active data block to return to the original subsidy lock state. In another example, the re-arming feature may be password protected. The handset device would check for the correct password for the unlock data block 34, for example, by asymmetric signature validation using the public key, as previously described. If the password validates, then the factory default data block is written over the active data block to accomplish the re-arming. If the factory default data block lock type was dual-layer, then a partial unlock data block password would be required and a partial unlock data block 405 would be asymmetric digital signature verified prior to re-arming with the factory default data block.

Figure 10:
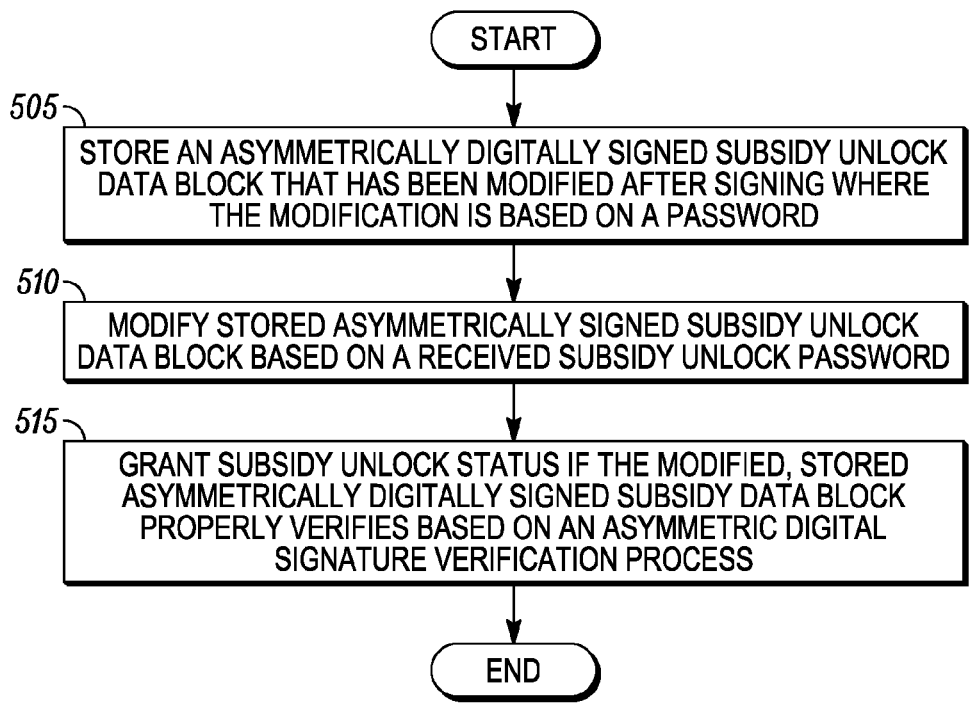
FIG. 10 is a flowchart illustrating one example of a method to control subsidy locking of a handset device in accordance with one embodiment of the disclosure.

FIG. 10 is a flowchart illustrating one example of a method to control subsidy locking of a handset device in accordance with one embodiment of the disclosure. The method 500 begins in step 505 by storing, in a handset device 20, an asymmetrically digitally signed subsidy unlock data block 34 that has been modified after signing. The modification is based on a password. In a first embodiment, the modifying of the unlock data block may include replacing or altering a password portion of the signed unlock data block. In a second embodiment, the modifying of the unlock data block may include encrypting the signed unlock data block, or portion thereof, based on a password. The second embodiment is further described with respect to FIG. 11, below. Referring again to FIG. 10, in step 510, the stored asymmetrically digitally signed subsidy unlock data block is modified based on a received subsidy unlock password. In the first embodiment, the modifying of the stored, unlock data block may include replacing the contents of the modified password portion of the stored subsidy unlock data block with a received subsidy unlock password. In the second embodiment, the modifying of the stored, unlock data block may include decrypting the stored unlock data block, or portion thereof, based on a received unlock password. The second embodiment is further described with respect to FIG. 11, below. Referring again to FIG. 10, in step 515, subsidy unlock status is granted if the modified, stored asymmetrically digitally signed subsidy unlock data block properly verifies based on an asymmetric digital signature verification process. The subsidy unlock data block 34 preferably includes a locking state parameter set to the unlock state. In this case, granting subsidy unlock status may further require that the locking state parameter of the verified subsidy unlock data block 34 be set to unlock. The subsidy unlock data block also preferably includes binding parameters associated with a circuit in the handset device 20 such that the subsidy unlock data block 34 is only valid in this particular handset. In this case, granting subsidy unlock status may further require that binding parameters in the verified subsidy unlock data block 34 match parameters associated with a circuit in the handset device 20. Granting subsidy unlock status is preferably performed by overwriting or copying the subsidy unlock data block 34 into the active data block 32 location.

Figure 11:
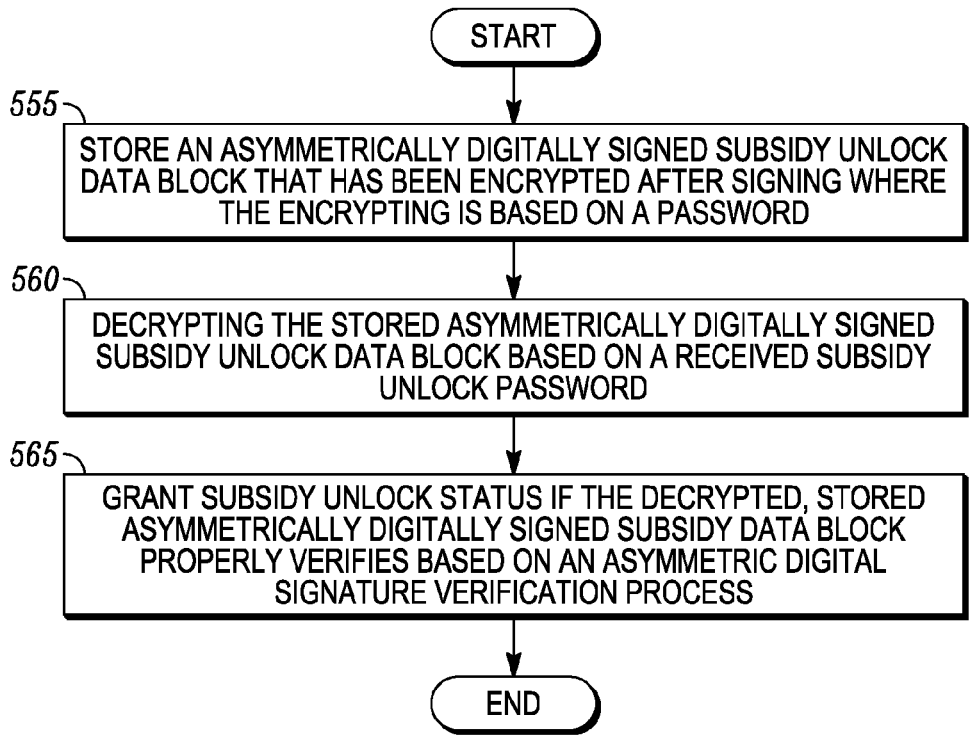
FIG. 11 is a flowchart illustrating one example of a method to control subsidy locking of a handset device in accordance with a second embodiment of the disclosure.

FIG. 11 is a flowchart illustrating one example of a method to control subsidy locking of a handset device in accordance with a second embodiment of the disclosure. The method 550 begins in step 555 by storing, in a handset device 20, an asymmetrically digitally signed subsidy unlock data block 34 that has been encrypted after signing. The encryption is based on a password. For example, a password may be generated using a random password generator. This password may be used directly or a representation of this password, such as a hash digest, may be used. The password may be used as an encryption key, as an initialization vector (IV) for the encryption, or as a means to derive an IV for the encryption. Methods for deriving an IV from a password include non-linear mathematical algorithms. One such algorithm includes seeding a linear feedback shift register with the password to produce the desired number of IV bits. Another such algorithm includes computing a SHA-1 hash digest on the password and then truncating the hash digest to the desired number of IV bits.

Once the IV value is derived, it is used with the encryption algorithm to encrypt the asymmetrically digitally signed unlock data block, or a portion thereof such as the signature field portion, prior to storing in the handset device. For example, a 3-DES encryption algorithm may be operated in output feedback (OFB) mode or counter (CTR) mode along with a secret key variable hidden in hardware to encrypt the signed unlock data block using the password-based IV. This secret key hardware encryption may be used to directly encrypt the signed unlock data block or may be used to encrypt a randomly-generated key variable that is then used in a software-implemented encryption algorithm to thereby encrypt the signed unlock data block using the password-based IV. The encrypted, signed unlock data block will not pass asymmetric signature verification without being decrypted.

In step 560, the stored asymmetrically digitally signed subsidy unlock data block is decrypted based on a received subsidy unlock password. When the user enters the subsidy unlock password into the handset device, the handset uses the entered subsidy unlock password as a decryption key, as an IV for decryption, or as a means to derive an IV for decryption. The use of the received subsidy unlock password corresponds to the method used for encrypting the signed unlock data block in step 555. For example, if a hash digest of the password was used to generate an IV for encrypting, then a similar hash digest of the received subsidy password is used to generate an IV for the corresponding decryption of the stored (encrypted) signed unlock data block, or portion thereof. The decryption method may include secret key hardware decryption or software-implemented decryption, or a combination thereof, corresponding to the method used for encrypting in step 555. If the correct subsidy password was provided to the handset, then the decryption process will regenerate a signed unlock data block that will pass asymmetric digital signature verification.

In step 565, subsidy unlock status is granted if the decrypted, stored asymmetrically digitally signed subsidy unlock data block properly verifies based on an asymmetric digital signature verification process. The subsidy unlock data block 34 preferably includes a locking state parameter set to the unlock state. In this case, granting subsidy unlock status may further require that the locking state parameter of the verified subsidy unlock data block 34 be set to unlock. The subsidy unlock data block also preferably includes binding parameters associated with a circuit in the handset device 20 such that the subsidy unlock data block 34 is only valid in this particular handset. In this case, granting subsidy unlock status may further require that binding parameters in the verified subsidy unlock data block 34 match parameters associated with a circuit in the handset device 20. Granting subsidy unlock status is preferably performed by overwriting or copying the subsidy unlock data block 34 into the active data block 32 location.

The above detailed disclosure, and the examples described therein, have been presented for the purposes of illustration and description. While the principles of the invention have been described above in connection with a specific device, it is to be clearly understood that this description is made only by way of example and not as a limitation on the scope of the invention.

What is claimed is:

1. A method for controlling subsidy locking of a handset device comprising:
   storing, in the handset device, an asymmetrically digitally signed subsidy unlock data block that comprises a password portion that is modified after the subsidy unlock data block is digitally signed;
   replacing the modified password portion with a received subsidy unlock password to produce an updated subsidy unlock data block for verification; and
   granting subsidy unlock status if the updated subsidy unlock data block properly verifies based on an asymmetric digital signature verification process.

2. The method of claim 1 wherein a hash digest of the received subsidy unlock password replaces contents of the modified password portion.

3. The method of claim 1 wherein granting subsidy unlock status comprises overwriting an active data block on the handset device with the subsidy unlock data block.

4. The method of claim 1 wherein the subsidy unlock data block further comprises a locking state parameter and wherein granting unlock status further requires verification of that the locking state parameter is set to an unlock state.

5. The method of claim 1 wherein the subsidy unlock data block further comprises a binding parameter associated with a circuit in the handset device and wherein granting subsidy unlock status further requires that the binding parameter matches the circuit in the handset device.

6. A subsidy-locked handset device comprising:
   memory storing an asymmetrically digitally signed subsidy unlock data block comprising a password portion that is modified after the subsidy unlock data block is digitally signed; and
   a controller operatively coupled to the memory and operative to replace the password portion with a received subsidy unlock password to produce an updated subsidy unlock data block for verification and to grant subsidy unlock status if the updated subsidy unlock data block properly verifies based on an asymmetric digital signature verification process.

7. The device of claim 6 further comprising a SIM card operatively coupled to the controller.

8. The device of claim 6 further comprising an asymmetric signature verification module operative to verify the asymmetric digital signature of the subsidy unlock data block based on an asymmetric digital signature verification process.

9. The device of claim 6 further comprising a user interface operative to provide user entry of the subsidy unlock password into the handset device.

10. The device of claim 6 wherein the controller is operative to generate a hash digest of the subsidy unlock password and to write the hash digest into the modified password portion.

11. The device of claim 6 wherein the subsidy unlock data block further comprises a locking state parameter and wherein the controller is further operative to grant subsidy unlock status if the locking state parameter is set to an unlock state.

12. The device of claim 6 wherein the subsidy unlock data block further comprises a binding parameter associated with a circuit in the handset device and wherein the controller is further operative to grant subsidy unlock status if the binding parameter matches the circuit in the handset device.

13. The device of claim 6 wherein the memory further comprises an asymmetrically digitally signed, partial unlock data block comprising a second password portion and a locking state parameter wherein the second password portion is modified after the partial unlock data block is digitally signed and wherein the controller is further operative to replace contents of the second password portion with the received subsidy unlock password to produce an updated partial unlock data block for verification, and to grant partial unlock status if the updated partial unlock data block properly verifies based on an asymmetric digital signature verification process and if the locking state parameter is set to a partial unlock state.

14. A storage medium comprising executable instructions that when read by one or more processing units, causes the one or more processing units to:
   store, in the handset device, an asymmetrically digitally signed subsidy unlock data block comprising a password portion that is modified after the subsidy unlock data block is digitally signed;
   replace the password portion with a received subsidy unlock password to produce an updated subsidy unlock data block for verification; and
   grant subsidy unlock status if the updated subsidy unlock data block properly verifies based on an asymmetric digital signature verification process.

15. The storage medium of claim 14 containing executable instructions that when read by one or more processing units, causes the one or more processing units to replace contents of the password portion with a hash digest of the received subsidy unlock password.

16. The storage medium of claim 14 containing executable instructions that when read by one or more processing units, causes the one or more processing units to overwrite an active data block in the handset device with the subsidy unlock data block when subsidy unlock status is granted.

17. The storage medium of claim 14 containing executable instructions that when read by one or more processing units, causes the one or more processing units to verify that the subsidy unlock data block comprises a locking state parameter set to an unlock state prior to granting subsidy unlock status.

18. The storage medium of claim 14 containing executable instructions that when read by one or more processing units, causes the one or more processing units to verify that subsidy unlock data block comprises a binding parameter associated with a circuit in the handset device prior to granting subsidy unlock status.

19. A method for controlling subsidy locking of a handset device comprising:
   storing, in a handset device, an asymmetrically digitally signed subsidy unlock data block that has been modified after signing wherein the modification is based on a password;
   modifying the stored asymmetrically digitally signed subsidy unlock data block based on a received subsidy unlock password; and
   granting subsidy unlock status if the modified, stored asymmetrically digitally signed subsidy unlock data block properly verifies based on an asymmetric digital signature verification process.

20. The method of claim 19 wherein the modifying based on a password includes encrypting the asymmetrically digitally signed subsidy unlock data block based on the password.

21. The method of claim 20 wherein the password is an encryption key for the encrypting.

22. The method of claim 20 wherein the password is an initialization vector for the encrypting.

23. The method of claim 20 wherein the password is used to derive an initialization vector for the encrypting.

24. The method of claim 20 wherein the encrypting is based on a hash digest of the password.

25. The method of claim 19 wherein modifying the stored asymmetrically digitally signed subsidy unlock data block based on a received subsidy unlock password includes decrypting the stored asymmetrically digitally signed subsidy unlock data block based on the received subsidy unlock password.

26. The method of claim 25 wherein the received subsidy unlock password is a decryption key for the decrypting.

27. The method of claim 25 wherein the received subsidy unlock password is an initialization vector for the decrypting.

28. The method of claim 25 wherein the received subsidy unlock password is used to derive an initialization vector for the decrypting.

29. The method of claim 25 wherein the decrypting is based on a hash digest of the password.

30. The method of claim 19 wherein the modifying based on a password includes altering the password held in a portion of the asymmetrically digitally signed subsidy unlock data block and wherein modifying the stored asymmetrically digitally signed subsidy unlock data block based on a received subsidy unlock password includes inserting the received subsidy unlock password into the stored asymmetrically digitally signed subsidy unlock data block.

* * * * *